United States Patent Office 3,453,089
Patented July 1, 1969

3,453,089
METHOD FOR REMOVING SOLVENTS FROM METAL HYDRIDE SOLVATES
Frank P. Del Giudice, Beverly, Mass., assignor to Metal Hydrides Incorporated, Beverly, Mass., a corporation of Massachusetts
No Drawing. Filed Feb. 7, 1962, Ser. No. 171,576
Int. Cl. C01h 6/04
U.S. Cl. 23—305       21 Claims This invention relates to the removal of solvent from solvates of metal hydrides, such as calcium borohydride tetrahydrofuranate, aluminum hydride diethyl etherate, lithium aluminum hydride dioxanate, lithium aluminum hydride tetrahydrofuranate, calcium borohydride butylaminate, etc.

Many metal hydrides have been discovered in recent years. Some of these are readily synthesized in the absence of any solvent. Others are prepared by metathetical reactions from solution, and are obtained unsolvated, or as solvates of limited thermal stability from which all of the solvent can be removed by vacuum and/or heating. Still others, however, are prepared in a solvent medium and form solvates of such stability that it has not been possible to remove the solvent completely without causing thermal decomposition of the hydride itself.

For many uses the solvated hydrides may be undesirable. Where the solvent of the solvate is different from the reaction medium, it may affect the course of a reduction or make isolation of a reduction product from a reaction mixture more difficult. Solvated metal hydrides may have undesirable solubility characteristics. Thus, lithium aluminum hydride dioxanate is insoluble in diethyl ether, and therefore is ill-suited for many of the applications commonly employing lithium aluminum hydride. Many metal hydrides have properties which make them potentially very useful propellant ingredients. They have high heats of combustion per unit weight and yield an abundance of low molecular weight combustion products. In general, metal hydrides, when solvated, lose these properties to such an extent that they are no longer more attractive than other conventional propellant fuels. Many of the hydrides of most interest, such as aluminum hydride, beryllium hydride, magnesium aluminum hydride, magnesium borohydride, beryllium aluminum hydride, and calcium borohydride, have not been successfully prepared in a solvent-free condition. For any application, the solvent generally represents "dead weight" and may represent significant, unnecessary bulk, weight, and handling requirements for the hydride product.

The present invention is based upon the discovery that when a metal hydride solvate with an ether or an amine is heated under vacuo, that is, while maintaining the solvate under a pressure less than atmospheric pressure, the removal of combined solvent therefrom is facilitated if a substantial amount of a metal halide which is soluble in the solvent of the solvate in the presence of the metal hydride component of the solvate is associated with the solvate. In general, an amount of such metal halide between about 1 percent and 35 by weight based upon the weight of the metal hydride component of the solvate being treated is effective. The minimum amount is dependent upon the temperature and reduced pressure used, the smaller the amount the greater the vacuum required. The temperature and reduced pressure conditions used may vary with the metal hydride solvate being treated and should be effective to remove solvent but such that the metal hydride component of the solvate is not decomposed. After removal of the solvent, the metal halide may be separated from the metal hydride, if desired, by extraction with a solvent in which one is soluble and the other is not and which does not form a solvate with the metal hydride.

Any metal halide may be used which is soluble in the solvent of the solvate in the presence of the metal hydride component of the solvate. I presently prefer to employ a metal halide selected from alkali metal halides, such as sodium, lithium or potassium chloride, iodide, bromide of fluoride, and alkaline earth metal halides, such as calcium chloride, iodide, bromide or fluoride.

As illustrative of metal hydride solvates from which solvent may be removed in accordance with the invention I may mention solvates of alkaline earth metal borohydrides, such as calcium borohydride and magnesium borohydride; alkali metal borohydrides, such as sodium borohydride and lithium borohydride; alkaline earth metal aluminum hydrides, such as magnesium aluminum hydride, beryllium aluminum hydride, and calcium aluminum hydride; alkali metal aluminum hydrides, such as lithium aluminum hydride; beryllium hydride, and aluminum hydride.

The invention is illustrated further by the following specific examples.

Example 1

To each of four flasks were added 10 grams of a mixture of lithium aluminum hydride and lithium chloride in the following proportions:
(1) 10% LiCl and 90% $LiAlH_4$
(2) 1% LiCl and 99% $LiAlH_4$
(3) 0.1% LiCl and 99.9% $LiAlH_4$
(4) All $LiAlH_4$ About 10 percent of tetrahydrofuran by weight based upon the weight of the mixture was condensed on each mixture and the vapor pressure at two different temperatures was measured. The following results were obtained.

| Flask No. | Temperature (° C.) | Vapor pressure (mm. Hg) |
|---|---|---|
| 1 | 28 | 7 |
|   | 60 | 14 |
| 2 | 28 | 3 |
|   | 60 | 10 |
| 3 | 26 | 1 |
|   | 60 | 3 |
| 4 | 27 | <1 |
|   | 60 | >1 |

These tests illustrate that the vapor pressure over the solvate increases as the amount of the metal halide associated with the solvate is increased.

Example 2

About 3 grams of lithium aluminum hydride was evacuated on the vacuum line and sufficient tetrahydrofuran was condensed on the hydride to form a complete solution. Tetrahydrofuran was then removed by vacuum distillation at 60° C. The vapor pressure of the white, opaque, solid furanate at 60° C. was 6 mm. Hg. The lithium aluminum hydride tetrahydrofuranate was cooled to room temperature and then about 1 gram of lithium chloride was added. The solvate melted to a thick slurry. The vapor pressure of this system at 60° C. was 9 mm. Hg. The system was pulled to dryness and all the tetrahydrofuran was recovered.

In a similar manner solvent was effectively removed from calcium borohydride butylaminate and calcium borohydride dimethylformaminate when associated with calcium chloride, from calcium borohydride tetrahydrofuranate when associated with calcium bromide, from lithium aluminum hydride dioxanate when associated with lithium iodide, from sodium borohydride ammoniate when associated with sodium chloride, from lithium aluminum hydride tetrahydrofuranate when associated with lithium chloride, from lithium borohydride diethyl etherate when associated with lithium bromide, and lithium borohydride isopropylaminate when associated with lithium chloride.

I claim:
1. The method for removing solvent from a solvate of a metal hydride selected from the group consisting of alkali metal borohydrides, alkaline earth metal borohydrides, alkali metal aluminum hydrides, alkaline earth metal aluminum hydrides, and aluminum hydride, which comprises associating the solvate with about 1 to 35 percent by weight of a metal halide based upon the weight of the metal hydride component of the solvate, and heating the mixture under temperature and reduced pressure conditions effective to remove solvent from the solvate but such that the metal hydride component of the solvate is not decomposed, said metal halide being selected from the group consisting of alkali metal halides and alkaline earth metal halides and being soluble in the solvent of the solvate, the solvent of the solvate being selected from the group consisting of ethers and amines.

2. The method as claimed by claim 1 wherein the solvate is a solvate of an alkaline earth metal borohydride.

3. The method as claimed by claim 1 wherein the solvate is a solvate of an alkali metal borohydride.

4. The method as claimed by claim 1 wherein the solvate is a solvate of an alkaline earth metal aluminum hydride.

5. The method as claimed by claim 1 wherein the solvate is a solvate of an alkali metal aluminum hydride.

6. The method as claimed by claim 2 wherein the metal halide is an alkaline earth metal halide.

7. The method as claimed by claim 3 wherein the metal halide is an alkali metal halide.

8. The method as claimed by claim 4 wherein the metal halide is an alkaline earth metal halide.

9. The method as claimed by claim 5 wherein the metal halide is an alkali metal halide.

10. The method as claimed by claim 6 wherein the solvate is a solvate of calcium borohydride.

11. The method as claimed by claim 7 wherein the solvate is a solvate of lithium borohydride.

12. The method as claimed by claim 7 wherein the solvate is a solvate of sodium borohydride.

13. The method as claimed by claim 9 wherein the solvate is a solvate of lithium aluminum hydride.

14. The method as claimed by claim 10 wherein the solvate is calcium borohydride butylaminate.

15. The method as claimed by claim 10 wherein the solvate is calcium borohydride dimethylformaminate.

16. The method as claimed by claim 10 wherein the solvate is calcium borohydride tetrahydrofuranate.

17. The method as claimed by claim 11 wherein the solvate is lithium borohydride diethyl etherate.

18. The method as claimed by claim 11 wherein the solvate is lithium borohydride isopropylaminate.

19. The method as claimed by claim 12 wherein the solvate is sodium borohydride ammoniate.

20. The method as claimed by claim 13 wherein the solvate is lithium aluminum hydride dioxanate.

21. The method as claimed by claim 13 wherein the solvate is lithium aluminum hydride tetrahydrofuranate.

No references cited.

CARL D. QUARFORTH, *Primary Examiner.*

MICHAEL J. McGREAL, *Assistant Examiner.*

U.S. Cl. X.R.

23—365, 204, 361